INVENTORS.
JOHN A. KAUFFMANN
ROBERT M. TOMASULO
BY William V Schelberg
AGENT

United States Patent Office 3,104,325
Patented Sept. 17, 1963

3,104,325

BINARY TRIGGER

John A. Kauffmann, Hyde Park, and Robert M. Tomasulo, Poughkeepsie, N.Y., assignor to International Business Machines Corporation, New York, N.Y., a corporation of New York Filed Nov. 7, 1957, Ser. No. 695,122
9 Claims. (Cl. 307—88)

This invention relates to binary trigger circuits and more particularly to a binary trigger circuit which employs magnetic cores.

A trigger may be defined as a bistable device which remains in either one of the two stable states until it is forced, or triggered, by an input signal to assume another state, and each subsequent input signal being effective to turn the trigger to the opposite state. Various binary triggers employing magnetic cores have been known heretofore which indicate one of the two stable states of the trigger by the presence of a signal at the output terminals once every cycle, which state is defined as the "On" condition. The other stable state, when the trigger is "Off," is distinguished from the "On" state by the absence of signals at the output terminals of the trigger. In logical systems, the need for a trigger which is, in addition to the above, capable of providing positive indications denoting the "Off" state of the trigger, has been found desirable.

In accordance with this invention, a binary trigger is provided by a novel arrangement of a two-way equals device interconnected with an inverter device. In this respect, it should be noted that an inverter device may be defined as a device having one input terminal and one output terminal at which a signal is delivered whenever there is an absence of signal to the input terminal, while a two-way equals device may be defined as a device having a first and a second input terminal and one output terminal at which a signal is delivered when either both inputs are available, or when both inputs are not available, coincidently, to the input terminals. The equals circuit is provided with one external variable signal to the first input terminal, while the second input to the equals device is provided by coupling the output of the inverter device to the second input terminals of the equals device. The input to the inverter device is provided by coupling the output of the equals device to the input terminal of the inverter device. Thus, whenever the condition of equals is not present, a singular input is provided to the equals device as a normal function of the inverter, which is regenerative due to the internal coupling, allowing a first stable operating state of the trigger. When an initial external input is directed into the first terminal of the equals device, an output is delivered from the equals device since equality is sensed due to the external input and the singular continuous input from the inverter device. Since the output from the equals device is the input to the inverter, there is no output from the inverter and thus no input to the second terminal of the equals device. Equality, here the absence of inputs, then exists, and an output is again delivered to the input terminals of the inverter. Regeneration of a second stable state of the trigger is thus accomplished. Upon application of a second signal to the first terminal of the equals device, a state of inequality, namely a singular input, exists, thus preventing an output from the equals device and engendering an output from the inverter. The trigger is now conditioned to operate in the first stable state. Since outputs may be obtained where each device is coupled to the other, signals may be obtained in each cycle of operation denoting one of the two stable states.

Accordingly, it is an object of this invention to provide a new and improved arrangement for binary trigger circuits.

A more specific object of this invention is to provide a new and improved arrangement for a binary trigger circuit which has a positive indication of each of the two stable states in which it may stably exist.

Yet another object of this invention is to provide a binary trigger circuit which employs magnetic cores and provides a positive indication of the two stable states.

Still another object of this invention is to provide a binary trigger which is adapted to receive input pulses over a selectable time interval and to produce output signals at a selectable time.

Other objects of the invention will be pointed out in the following description and claims and illustrated in the accompanying drawings, which disclose, by way of example, the principle of the invention and the best mode, which has been contemplated, of applying that principle.

Figure 1:
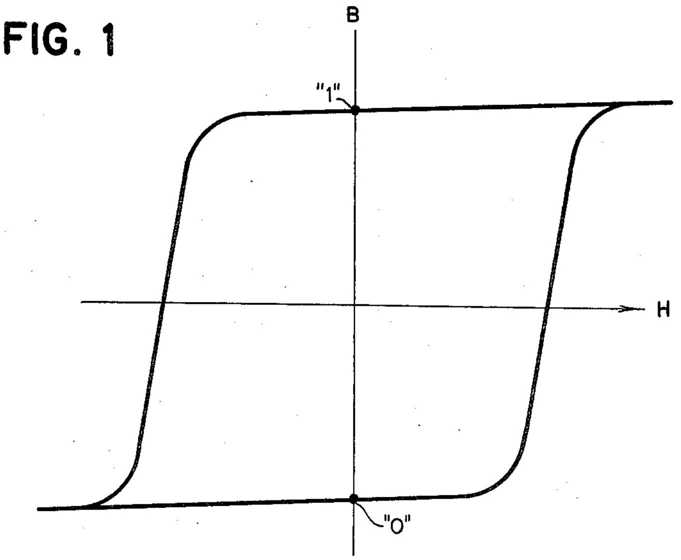
FIG. 1 is a representation of the hysteresis characteristic obtained for a magnetic material of the type employed.

Referring to FIGURE 1, the curve illustrated comprises a plot of flux density (B) versus applied field (H) for a magnetic core having a substantially rectangular hysteresis characteristic. The opposite remanence states are conventionally employed for representing binary information and are arbitrarily designated as "0" and "1" in the figure. With a "0" stored, a pulse applied to a winding linking the core in proper sense causes the loop to be traversed and the remanence state "1" attained when the pulse terminates, hereinafter referred to as a "write" signal. Similarly, the core is read out or returned to the "0" state in determining what information has been stored by applying a pulse in the reverse sense to the same, or another winding, linking the core, such a pulse is hereafter referred to as a "read" signal. Should a "1" have been stored, a large flux change occurs with the shift from "1" to "0" conditions with a corresponding voltage magnitude developed in an output winding. On the other hand, should a "0" have been stored, little flux change occurs and negligible signal is developed on the output winding.

Figure 2:
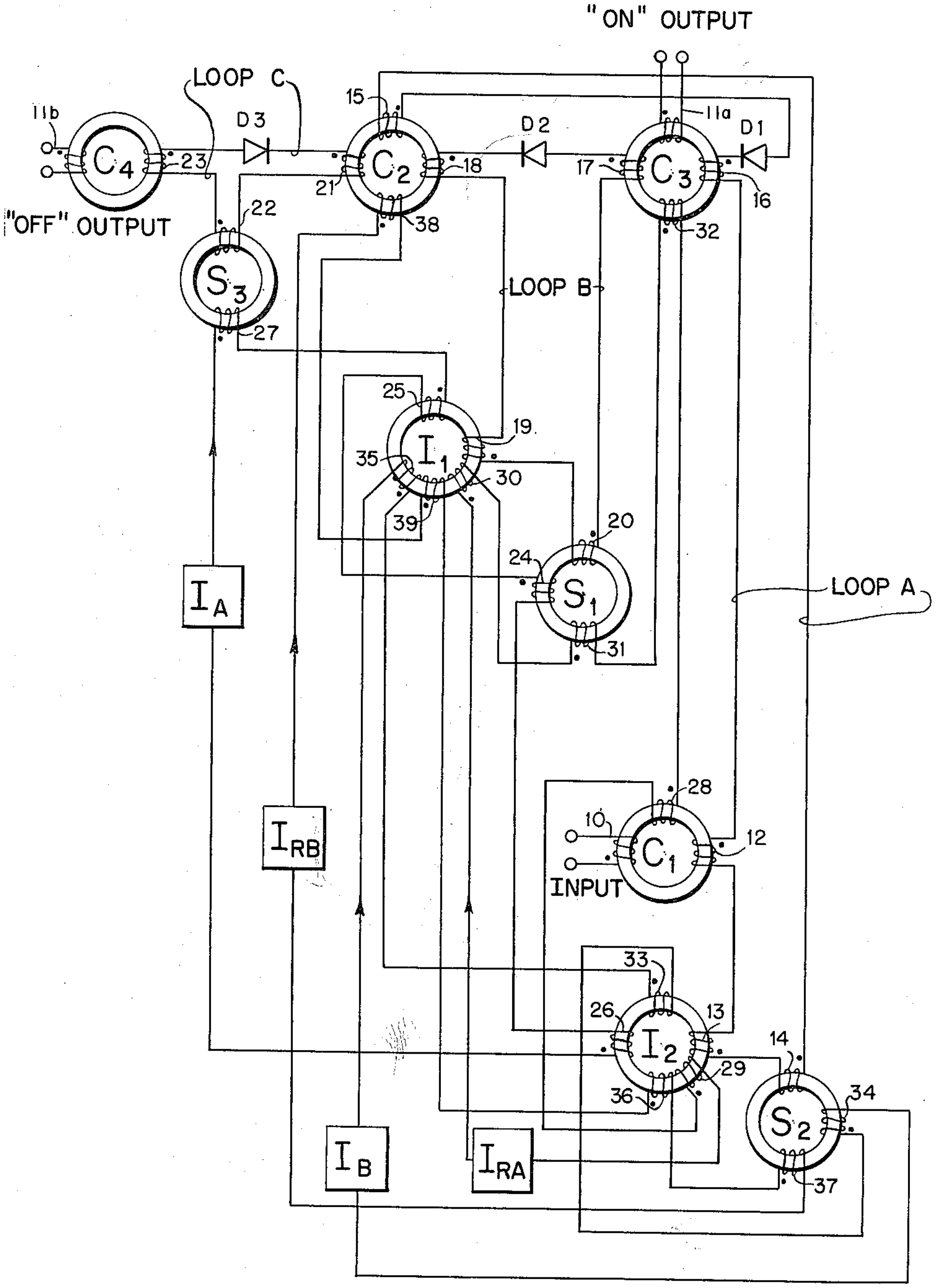
FIG. 2 is a circuit diagram of a magnetic core binary trigger.

A dot is shown adjacent one winding terminal of each of the windings illustrated in the FIGURE 2, indicating its winding direction. A "write" pulse is a positive pulse which is directed into the undotted end of the winding terminal which tends to store a "1," while a "read" pulse is a positive pulse directed into the dotted end of the winding terminal and tends to apply negative field or store a "0."

Referring to the FIGURE 2, the arrangement disclosed employs input, output and inhibit coupling cores arranged intermediate to so called storage magnetic cores which store certain logical information and this arrangement is adapted to be interconnected with similar type circuitry through such input and output coupling cores. Further, the inhibit cores are utilized in this embodiment to provide a voltage source in a given circuit for every cycle of operation which may provide a switching current to a further core in the circuit. A number of logical components have been devised which utilize this type of operation as further described and claimed in a copending application, Serial No. 689,827, now abandoned, filed October 14, 1957, and another copending application, Serial No. 692,131, filed October 24, 1957, on behalf of John A. Kauffmann, which applications are assigned to the same assignee.

The interconnecting coupling cores are illustrated in the subsequently described circuit and are labeled $C_1$, $C_2$, $C_3$ and $C_4$ while the inhibit cores are labeled $I_1$ and $I_2$ for clarity. Also shown are two storage cores $S_1$ and $S_2$ which are adapted to store information received. The core $S_1$ is adapted to deliver information received to other logical components and to serve as a regenerative input to the core $C_3$. The storage core $S_2$ is adapted to transfer information received to a further storage core $S_3$ of another logical component and to supply this information as an input to the circuit associated with the storage $S_1$.

The coupling core $C_1$ is provided with an input winding 10 to which input pulses are applied while the core $C_3$ is provided with an output winding 11*a*, at the terminals of which a signal appears indicating the "On" state of the trigger. The core $C_1$, is also provided with an output winding 12 which is interconnected with an output winding 13 on the core $I_2$, an output winding 14 on the core $S_2$, an input winding 15 on the core $C_2$, and an output winding 16 on the core $C_3$ through a diode $D_1$, which windings are series connected to comprise a circuit which hereinafter is referred to as loop A. The coupling core $C_3$ is also provided with an input winding 17 which is series connected to an output winding 18 on the core $C_2$ through a diode $D_2$, an output winding 19 on the core $I_1$, and an output winding 20 on the core $S_1$ which circuit is hereinafter referred to as loop B. Similarly, the core $C_2$ is further provided with an output winding 21 which is coupled with a winding 22 on the core $S_3$. The core $C_4$ represents a further coupling core that may be coupled to the storage core $S_3$ through a winding 23 series connected with the windings 21 and 22 through a further diode $D_3$ hereinafter referred to as loop C. The core $C_4$ is provided with an output winding 11*b* at the terminal of which a signal appears indicating the "Off" state of the trigger.

The storage cores $S_1$ and $S_3$, along with the inhibit coupling cores $I_1$ and $I_2$ are energized from a clock pulse source $I_A$, while the cores $C_1$, $S_1$, $C_3$, $I_1$ and $I_2$ are energized from a clock pulse source $I_{RA}$. Similarly, the cores $I_1$, $I_2$, and $S_2$ are energized from a clock pulse source $I_B$ while the cores $I_1$, $I_2$, $S_2$ and $C_2$ are energized from a clock pulse source $I_{RB}$. The core $S_1$ is provided with a winding 24 which is interconnected with a winding 25 on the core $I_1$, a winding 26 on the core $I_2$ and a winding 27 on the core $S_3$ which windings are series connected to the clock pulse source $I_A$. Similarly, a winding 28 on the core $C_1$, a winding 29 on the core $I_2$, a winding 30 on the core $I_1$, a winding 21 on the core $S_2$, and a winding 32 on the core $C_3$ series connected with the clock pulse source $I_{RA}$, while a winding 33 on the core $I_2$, a winding 34 on the core $S_2$ and a winding 35 on the core $I_1$ are series connected with the clock pulse source $I_B$. A winding 36 which is provided on the core $I_2$ is series connected with a winding 37 on the core $S_2$, a winding 38 on the core $C_2$, a winding 39 on the core $I_1$ and the clock pulse source $I_{RB}$.

Figure 3:
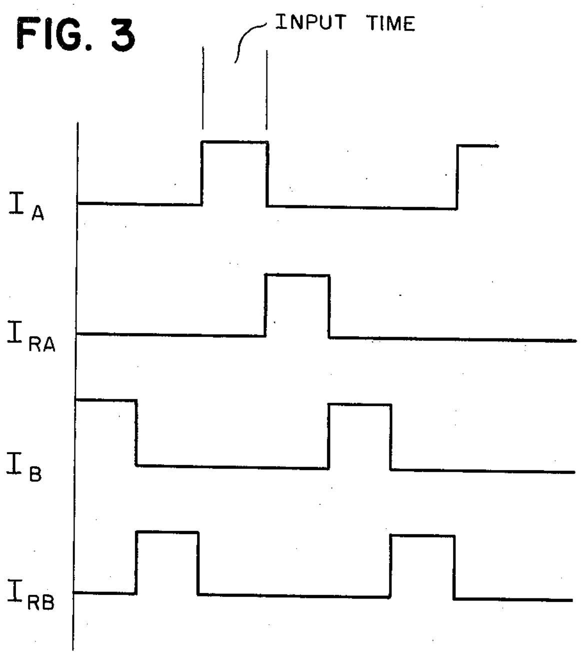
FIG. 3 illustrates the relative timing of current pulses which are required for operation of the circuit disclosed in FIGURE 2.

The sequence of pulses provided by the several clock pulse sources described above is indicated in the FIGURE 3 and the time of appearance of an input pulse occurs at the time the $I_A$ clock pulse appears. Further, the various clock pulse sources provide an open circuit connection when not actuated to prevent any deleterious effect when the device is operated.

Referring again to FIGURE 2, consider as an initial condition that all cores are in the lower remanence condition "0" as shown in FIGURE 1. Consider further that there is an absence of a signal input into the winding 10 on the core $C_1$. Initially, the $I_A$ clock pulse source directs a write signal to the winding 26 on the core $I_2$, and a read signal into the windings 24, 25 and 27 on the cores $S_1$, $S_3$ and $I_1$, respectively. The core $I_2$ switches from the "0" to the "1" state and in so doing induces a voltage on the output winding 13 with the undotted end positive which tends to cause a clockwise current in the loop A. The clockwise current is blocked and its energy is dissipated by the high back resistance of the diode $D_1$. Upon termination of the $I_A$ clock pulse, the $I_{RA}$ clock pulse source directs a read signal into the windings 28, 29, 30, 31 and 32 on the cores $C_1$, $I_2$, $I_1$, $S_1$ and $C_3$, respectively, which switches the core $I_2$ from the "1" to the "0" state. The core $I_2$ in switching induces a voltage on the output winding 13 with the dotted end positive causing a counter-clockwise current in the loop A. This counter-clockwise current tends to write the cores $S_2$ and $C_2$ and read the cores $C_3$ and $C_1$. The core $S_2$ switches preferentially since the winding 14 has a greater number of turns in comparison to the winding 15 and the cores $C_3$ and $C_1$ are already in the "0" state. Subsequently, the $I_B$ clock pulse source directs a read signal into the windings 33 and 34 on the cores $I_2$ and $S_2$, respectively, and a write signal into the winding 35 on the core $I_1$. During this interval, the core $S_2$ switches from the "1" to the "0" state to induce a voltage on the output winding 14 with the dotted end positive, causing a counterclockwise current in loop A which tends to write the core $C_2$, read the cores $C_3$ and $C_1$, and write the core $I_2$. Since the cores $C_3$ and $C_1$ are already in the "0" state, and the core $I_2$ is held in the "0" state by the $I_B$ drive, the core $C_2$ is switched from the "0" to the "1" state. The core $C_2$ in switching induces a voltage on the output windings 18 and 21, with the undotted end positive. The induced voltage on the winding 21 causes a counter-clockwise current in loop C which tends to write the cores $S_3$ and $C_4$, but switches the core $S_3$ from the "0" to the "1" state preferentially. The core $I_1$ is also switched from the "0" to the "1" state by the $I_B$ drive, and in so doing induces a voltage on the output winding 19 with the undotted end positive. The induced voltage on the windings 18 and 19 in effect, cancel and negligible current flows in the loop B. After application of the $I_B$ clock pulse, the $I_{RB}$ clock pulse source directs a read signal into the windings 36, 37, 38 and 39 on the cores $I_2$, $S_2$, $C_2$ and $I_1$, respectively, which switches the cores $C_2$ and $I_1$ from the "1" to the "0" state. At this time, the core $C_2$ in switching from the "1" to the "0" state induces a voltage on the windings 15, 18 and 21, respectively, with the dotted end positive. The induced voltage in the winding 21 tends to cause a counterclockwise current in loop C which is blocked by the diode $D_3$. The induced voltage in the winding 15 causes a counterclockwise current in the loop A which tends to read the cores $C_3$ and $C_1$, and write the cores $I_2$ and $S_2$. This current in loop A has negligible effect since the cores $C_3$ and $C_1$ are already in the "0" state, while the cores $I_2$ and $S_2$ are held in the "0" state by the $I_{RB}$ drive. The core $I_1$ in switching to the "0" state induces a voltage on the output winding 19 with the dotted end positive which effectively cancels the induced voltage on the winding 18 to allow negligible current flow in the loop B.

Thus, the trigger is in the "Off" state, in that there will be an absence of signal at the output winding 11*a* upon application of the $I_A$ clock pulse in the next cycle of operation. Information, however, has been transferred to the storage core $S_3$ which is possible of further transfer through the core $C_4$ denoting the "Off" state of the trigger and the cycle of operation is seen to be repetitive.

Assume now, an input pulse is directed into the undotted end of the winding 10 on the core $C_1$. The core $C_1$ is then switched from the "0" to the "1" state and in so doing a voltage is induced on the output winding 12 with the undotted end positive. At the same time, the $I_A$ clock pulse source directs a signal into the windings 24, 25 and 26 on the core $S_1$, $I_1$ and $I_2$, respectively, which tends to read the cores $S_1$ and $I_1$ while tending to write the core $I_2$. The core $I_2$ switches from the "0" to the "1" state and in so doing induces a voltage on the output winding 13 with the undotted end positive. The algebraic sum of the induced voltage on the windings 12 and 13 is effectively zero, and negligible current flows in the loop A. Subsequently, the $I_{RA}$ clock pulse source directs a reset signal into the windings 28, 29, 30, 31 and 32 on the cores $C_1$, $I_2$, $I_1$, $S_1$ and $C_3$, respectively, which switches the cores $C_1$ and $I_2$ from the "1" to the "0" state. The cores $C_1$ and $I_2$ in switching induce a voltage on the output windings 12 and 13, respectively, with their dotted end positive. The induced voltages effectively cancel, and again, negligible current flows in loop A. Upon termination of the $I_{RA}$ clock pulse, the $I_B$ clock pulse source directs a signal into the windings 33, 34 and 35 on the cores $I_2$, $S_2$ and $I_1$, respectively, which tends to read the cores $I_2$ and $S_2$ and write the core $I_1$. The core $I_1$ switches from the "0" to the "1" state and in so doing induces a voltage on the output winding 19 with the undotted end positive, tending to cause a clockwise current in loop B which is blocked by the diode $D_2$. The $I_{RB}$ clock pulse source next directs a reset signal into the windings 36, 37, 38 and 39 on the cores $I_2$, $S_2$, $C_2$ and $I_1$, respectively, which switches the core $I_1$ from the "1" to the "0" state. The core $I_1$ in switching induces a voltage on the output winding 19 with the dotted end positive causing a counterclockwise current in the loop B which preferentially switches the core $S_1$ from the "0" to the "1" state.

In the next cycle of operation, if there is an absence of input into the winding 10 on the core $C_1$, the $I_A$ clock pulse source directs a signal into the windings 24, 25 and 26 on the cores S·, $I_1$ and $I_2$, respectively, which tends to read the cores $I_1$ and $S_1$ and write the core $I_2$. The core $S_1$ switches from the "1" to the "0" state, while the core $I_2$ switches from the "0" to the "1" state. The core $S_1$ in switching induces a voltage on the output winding 20 with the dotted end positive causing a counter-clockwise current in the loop B which tends to write the core $C_3$, read the core $C_2$, and write the core $I_1$. The core $C_2$ is already in the "0" state while the core $I_1$ is held in the "0" state by the $I_A$ drive, allowing the core $C_3$ to switch from the "0" to the "1" state. The core $C_3$ in switching induces a voltage on the output windings 11*a* and 17 with the undotted end positive. The voltage induced on the winding 11*a* constitutes the output signal from the trigger in the "On" state which may be utilized in further similar circuitry. Meanwhile, the core $I_2$ which is switched induces a voltage on its output winding 13 with the undotted end positive. The sum of the induced voltages on the windings 16 and 13 is then effectively zero and negligible current flows in the loop A. At the termination of the $I_A$ clock pulse, the core $S_1$ is left in the "0" remanence state, while the cores $C_3$ and $I_2$ are left in the "1" remanence condition. The $I_{RA}$ clock pulse source now directs a read signal into the windings 28, 29, 30, 31 and 32 on the cores $C_1$, $I_2$, $I_1$, $S_1$ and $C_3$, respectively, which switches the cores $I_2$ and $C_3$ from the "1" to the "0" state. The cores $I_2$ and $C_3$ in switching induce a voltage on the windings 16 and 13 with their dotted end positive which voltages effectively cancel to allow negligible current flow in the loop A. The core $C_3$ in switching also induces a voltage on the winding 17 with the dotted end positive causing a counter-clockwise current in the loop B which tends to read the core $C_2$ and write cores $I_1$ and $S_1$. Since the core $C_2$ is already in the "0" state, while the core $I_1$ and $S_1$ are held in the "0" state by the $I_{RA}$ drive, at the termination of the $I_{RA}$ clock pulse all cores are left in the "0" remanance state. Further application of the $I_B$ and $I_{RB}$ clock pulses serves to pass information to the storage core $S_1$ without the transfer of information to the core $S_3$ as fully described above. The cyclic operation will continue denoting the "On" state of the trigger until a further input is directed into the winding 10 on the core $C_1$.

While the circuit is in the latter state of operation, assume an input signal is directed into the undotted end of the winding 10 on the core $C_1$. This input signal switches the core $C_1$ from the "0" to the "1" state and in so doing induces a voltage on the output winding 12 with the undotted end positive. At the same time, the $I_A$ clock pulse source has directed a signal into the windings 24, 25 and 26 on the cores $S_1$, $I_1$ and $I_2$, respectively, which tends to read the cores $I_1$ and $S_1$ and write the core $I_2$. The core $S_1$, which was left in the "1" state as described previously, is switched to the "0" state while the core $I_2$ is switched from the "0" to the "1" state. The core $S_1$ in switching induces a voltage on the output winding 20 with the dotted end positive causing a counter-clockwise current in the loop B which switches the core $C_3$ from the "0" to the "1" state. The core $C_3$ in switching from the "0" to the "1" state induces a voltage on the output winding 16 with the undotted end positive. The core $I_2$ which is also switched from the "0" to the "1" state induces a voltage on its output winding 13 with the undotted end positive. The algebraic sum of the induced voltages on the windings 16, 12, and 13 is such as to cause a counter-clockwise current in the loop B which preferentially switches the core $S_2$ from the "0" to the "1" state. At the termination of the input signal, and the $I_A$ clock pulse, the cores $C_3$, $C_1$, $I_2$ and $S_2$ are left in the "1" remanence state, while the core $S_1$ is left in the "0" remanence state. Subsequently, the $I_{RA}$ clock pulse source directs a read signal into the windings 28, 29, 30, 31 and 32 on the cores $C_1$, $I_2$, $I_1$, $S_1$ and $C_3$, repsectively, which switches the cores $C_3$, $C_1$ and $I_2$ from the "1" to the "0" state. The cores $C_3$, $C_1$ and $I_2$ in switching induce a voltage on the output windings 16, 12, and 13, respectively, with their dotted end positive. The algebraic sum of the induced voltages tend to cause a clockwise current in the loop A which is blocked by the diode $D_1$. The core $C_3$ in switching induces a voltage on the winding 17 with the dotted end positive causing a counter-clockwise current in the loop B. This current tends to read the core $C_2$ and write the cores $I_1$ and $S_1$. These cores are uneffected since the core $C_2$ is already in the "0" state, while the cores $I_1$ and $S_1$ are held in the "0" state by the $I_{RA}$ drive. At the termination of the $I_{RA}$ clock pulse all cores are left in the "0" remanence state except the core $S_2$ which is left in the "1" remanence state. At this point we perceive that the condition of the circuit is now the same as described above in the instance of no signal input to the circuit before application of the $I_B$ and $I_{RB}$ clock pulses. Thus, information will be transferred to the storage core $S_3$ giving a positive indication of the "Off" state of the binary trigger.

In the interest of providing a complete disclosure details of one embodiment of the trigger device wherein ferrite cores are employed is given below; however, it is to be understood that other component values and current magnitudes may be employed with satisfactory operation attained so that the values given should not be considered limiting.

With the clock pulse currents $I_A$ and $I_B$ delivering a constant current of 1.9 amperes, the windings 26 and 35 may comprise four turns, the windings 25 and 33 may comprise five turns and the windings 24, 27 and 34 may comprise ten turns. With the clock pulse currents $I_{RA}$ and $I_{RB}$ delivering a constant current of 1.4 amperes, the windings 28, 29, 30, 31, 32, 36, 37, 38 and 39 may comprise five turns. In the coupling circuits interconnecting the storage, inhibit and coupling cores, the windings 15, 17 and 23 may comprise five turns, the windings 14, 20 and 22 may comprise ten turns, the windings 12, 13, 16, 18, 19 and 21 may comprise twelve turns and the windings 10 and 11 may comprise five turns and twelve turns, respectively, with the diodes $D_1$, $D_2$ and $D_3$ having characteristics exhibited by the 1N270 diode manufactured by the Transitron Company.

Each of the storage, inhibit and coupling cores may comprise toroids of magnesium-manganese ferrite composition having an outside diameter of 0.100 inch, inside diameter of 0.070 inch and thickness of 0.120 inch. This thickness may be obtained by stacking four cores, each 0.030 inch thick, and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the folowing claims.

What is claimed is:

1. A magnetic binary trigger comprising a first and a second magnetic storage core; control winding means on each of said cores; an input coupling core and a first and a second output coupling core; input and output winding means on each of said coupling cores; a first and a second inhibit core; output winding means on said inhibit cores; each of said cores capable of attaining different stable states of residual flux density; circuit means including a diode series connecting the output winding means on said first output coupling core, said input coupling core and said first inhibit core, said control winding means on said first storage core and said input winding means on said second output coupling core; further circuit means including a second diode series connecting the output winding means on said second output coupling core and said second inhibit core, said control winding means on said second storage core and said input winding means on said first output coupling core; a first, a second, a third and a fourth clock pulse source adapted to deliver a series of pulses displaced in time; a first group of winding means on said first output coupling core, said input coupling core, said inhibit cores and said second storage core connected to said first clock pulse source so as to cause said first output coupling core, said input coupling core, said inhibit cores and said second storage core to shift to a zero residual state when energized; a second group of winding means on said first storage core and said inhibit cores connected to said second clock pulse source so as to cause said first storage core and said first inhibit core to shift to zero and said second inhibit core to shift to a one residual state when energized; a third group of winding means on said first storage core, said second output coupling core and said inhibit cores connected to said third clock pulse source so as to cause said first storage core, said second output coupling core and said inhibit cores to switch to the zero residual state when energized, a fourth group of winding means on said second storage core and said inhibit cores connected to said fourth clock pulse source so as to cause said second storage core and said second inhibit core to shift to the zero and said first inhibit core to shift to the one residual state when energized.

2. A magnetic binary trigger comprising a first and a second storage core each being formed of material having a substantially rectangular hysteresis characteristic; control winding means on each of said storage cores; an input coupling core and a first and second output coupling core; input and output winding means on each of said coupling cores; a first and second inhibit core; output winding means on each of said inhibit cores; each of said coupling and inhibit cores capable of attaining different states of residual flux density, circuit means including an asymmetrical impedance device connecting the output winding means on said first output coupling core, said input coupling core and said first inhibit core, said control winding means on said first storage core and said input winding means on said second output coupling core; further circuit means including a second asymmetrical impedance device connecting the output winding means on said second output coupling core and said second inhibit core, said control winding means on said second storage core and said input winding means on said first output coupling core; shift winding means on said first coupling core series connected with shift winding means on said input coupling core, each of said inhibit cores and said second storage core adapted to be energized from a first clock pulse source and to drive said first coupling core, said input coupling core, each of said inhibit cores and said second storage core toward a datum residual state; a shift winding means on said first storage core series connected with shift winding means on each of said inhibit cores adapted to be energized from a second clock pulse source and to drive said first storage core and said first inhibit core toward the datum residual state and said second inhibit core toward an opposite residual state; shift winding means on said first storage core series connected with shift winding means on said second output coupling core and each of said inhibit cores adapted to be energized from a third clock pulse source and to drive said first storage core, said second output core and each of said inhibit cores toward the datum residual state; shift winding means on said second storage core series connected with shift winding means on each of said inhibit cores adapted to be energized from a fourth clock pulse source and to drive said second storage core and said second inhibit core toward the datum residual state and said first inhibit core toward the opposite residual state.

3. A device as described in claim 2 including means for energizing said shift winding means including said first, second, third and fourth clock pulse source wherein said sources are actuated in sequence in the order named.

4. A magnetic binary trigger comprising a first and a second magnetic storage core; control winding means on each of said cores; an input coupling core and a first and a second output coupling core; input and output winding means on each of said coupling cores; a first and a second inhibit core; output winding means on each of said inhibit cores; each of said cores capable of attaining different stable states of residual flux density, circuit means including an asymmetrical impedance device connecting the output winding means on said first output core; said input core and said first inhibit core, said control winding means on said first storage core and said input winding means on said second output core; further circuit means including a second asymmetrical impedance device connecting the output winding means on said second output core and said second inhibit core, said control winding means on said second storage core and said input winding means on said first output core; shift winding means on said first output core, said input core, each of said inhibit cores and said second storage core adapted to be energized simultaneously and to drive said first output core, said input core, each of said inhibit cores and said second storage core toward a first limiting residual state; additional shift winding means on said first storage core and each of said inhibit cores adapted to be energized simultaneously and to drive said first storage core and said first inhibit core toward the first state and to drive said second inhibit core toward a second limiting residual state; further shift winding means on said first storage core, said second output core and each of said inhibit cores adapted to be energized simultaneously and to drive said first storage core, said second output core and each of said inhibit cores toward the first residual state; and shift winding means on said second storage core and each of said inhibit cores adapted to be energized simultaneously and to drive said second storage core and said second inhibit core toward the first residual state and said first inhibit core toward the second residual state.

5. A bistable device comprising a magnetic binary two-way equals device having a first and a second input means magnetically coupled to an output means operative to provide a signal on the output thereof when both said first and second inputs have a similar energization status; a binary inverter device having a single input magnetically coupled to a single output operative to provide a signal on the output thereof in the absence of a signal to the input; means coupling the output of said equals device to the input of said inverter device and further coupling the output of said inverter device to the first input of said equals device for inhibiting the output from the inverter device when said equals device is operative to produce an output; signal means operably connected with the second input of said equals device; said signal means selectively applying a first signal to the second input of said equals device to cause said bistable device to assume a first state of operation; said signal means selectively applying a second signal to the second input of said equals device to cause said bistable device to assume a second state of operation.

6. The bistable device of claim 5 including separate output means coupled to the output means of said equals device and further output means coupled to the output means of said inverter device to provide positive signal indications of each of the stable states of said bistable device.

7. A magnetic bistable device comprising a binary two-way equals device having a first and a second input means and an output means and operative to provide a signal on the output means thereof when both the first and second inputs have a similar energization status; a binary inverter device having a single input means and an output means and operative to provide a signal on the output means thereof in the absence of a signal to the single input means thereof; first means connecting the output means of said equals device to the single input means of said inverter device; second means connecting the output means of said inverter device to the first input means of said equals device; and signal means coupled to the second input means of said equals device for selectively causing said bistable device to assume different stable states.

8. A magnetic bistable device as defined in claim 7 further comprising first means connected to the output means of said binary two-way equals device for providing a signal indicative of operation of said bistable device in a first stable state, and second means connected to the output means of said binary inverter device for providing a signal indicative of operation of said device in a second stable state.

9. A magnetic binary trigger circuit comprising in combination a logical binary equals device and a logical binary inverter device, said equals device having first and second input terminals and an output terminal and operative to provide a signal on the output terminal thereof only when pulses are applied to both said first and second input terminals and when pulses are not applied to both said first and second input terminals, said inverter device having one input terminal and one output terminal and operative to provide a signal on the one output thereof only when pulses are not applied to said one input terminal, circuit means coupling the one output terminal of said inverter device to the second input terminal of said equals device and the output terminal of said equals device to the one input terminal of said inverter device and signal means coupled to the first input terminal of said equals device.

References Cited in the file of this patent

UNITED STATES PATENTS

| | | |
|---|---|---|
| 2,751,546 | Dimmer | June 19, 1956 |
| 2,778,006 | Guterman | Jan. 15, 1957 |
| 2,838,746 | Eckert | June 10, 1958 |
| 2,954,481 | Steagall | Sept. 27, 1960 |